United States Patent [19]

Nielsen

[11] Patent Number: 5,070,998
[45] Date of Patent: Dec. 10, 1991

[54] CONVEYOR SYSTEM FOR A FISH CLEANING PLANT

[75] Inventor: Jens U. Nielsen, Copenhagen, Denmark

[73] Assignee: Lumetech A/S, Hellerup, Denmark

[21] Appl. No.: 623,986

[22] PCT Filed: Jun. 22, 1989

[86] PCT No.: PCT/DK89/00155
§ 371 Date: Dec. 21, 1990
§ 102(e) Date: Dec. 21, 1990

[87] PCT Pub. No.: WO89/12398
PCT Pub. Date: Dec. 28, 1989

[30] Foreign Application Priority Data

Jun. 23, 1988 [DK] Denmark .................... 3443/88

[51] Int. Cl.[5] .............................................. B65G 15/14
[52] U.S. Cl. .................... 198/587; 198/626.1; 198/626.5; 198/631
[58] Field of Search ............... 198/626.1, 626.5, 626.6, 198/631, 587

[56] References Cited

U.S. PATENT DOCUMENTS

| 1,219,077 | 3/1917 | Buchanan | 198/626.1 X |
| 3,915,282 | 10/1975 | Remensperger | 198/456 |
| 4,094,399 | 6/1978 | George | 198/631 X |
| 4,244,461 | 1/1981 | Fischer et al. | 198/456 |
| 4,502,586 | 3/1985 | Dusel et al. | 198/626.6 X |
| 4,674,636 | 6/1987 | Sekitani et al. | 198/626.6 X |
| 4,735,302 | 4/1988 | Marchetti | 198/626.6 X |

FOREIGN PATENT DOCUMENTS 3243906 10/1983 Fed. Rep. of Germany.
822264 11/1955 United Kingdom.

Primary Examiner—D. Glenn Dayoan
Attorney, Agent, or Firm—Ladas & Parry

[57] ABSTRACT

A conveyor system suitable for holding food products, such as fish, comprising a feed conveyor, having a discharge end, a receiving conveyor having a receiving end, a double conveyor having a collecting end adjacent said discharge end and an output end adjacent the receiving end. The double conveyor has two cooperating conveyor belts arranged vertically one above the other so as to be capable of gripping food products on the feed conveyor and being able to transport the food products to the receiving conveyor, the collecting end of the double conveyor is laterally displaceable in response to information signals obtained from a preceding processing station.

3 Claims, 3 Drawing Sheets

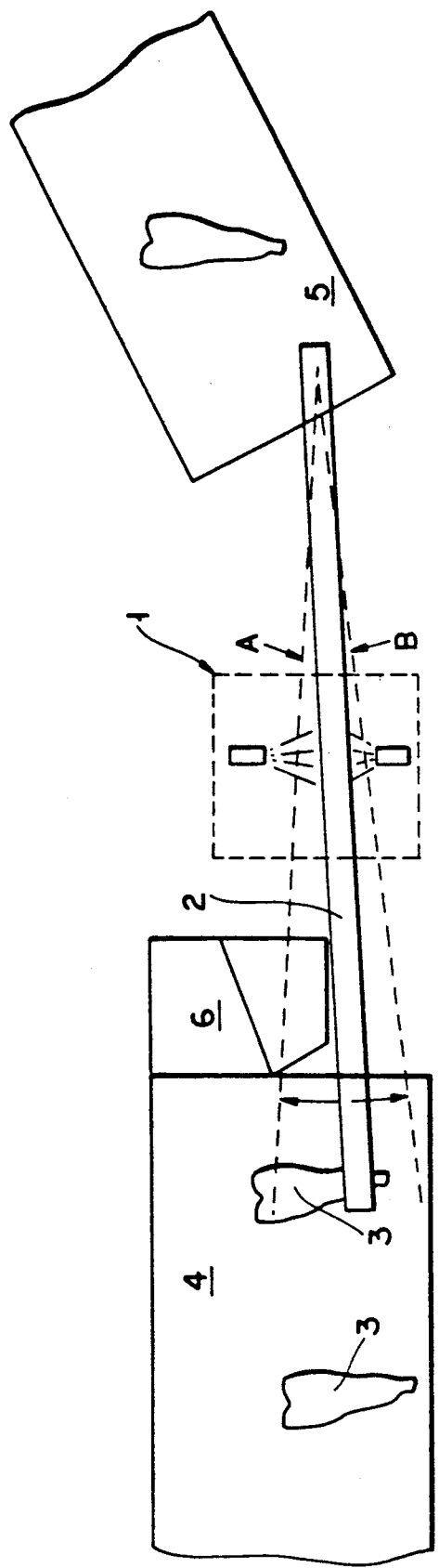
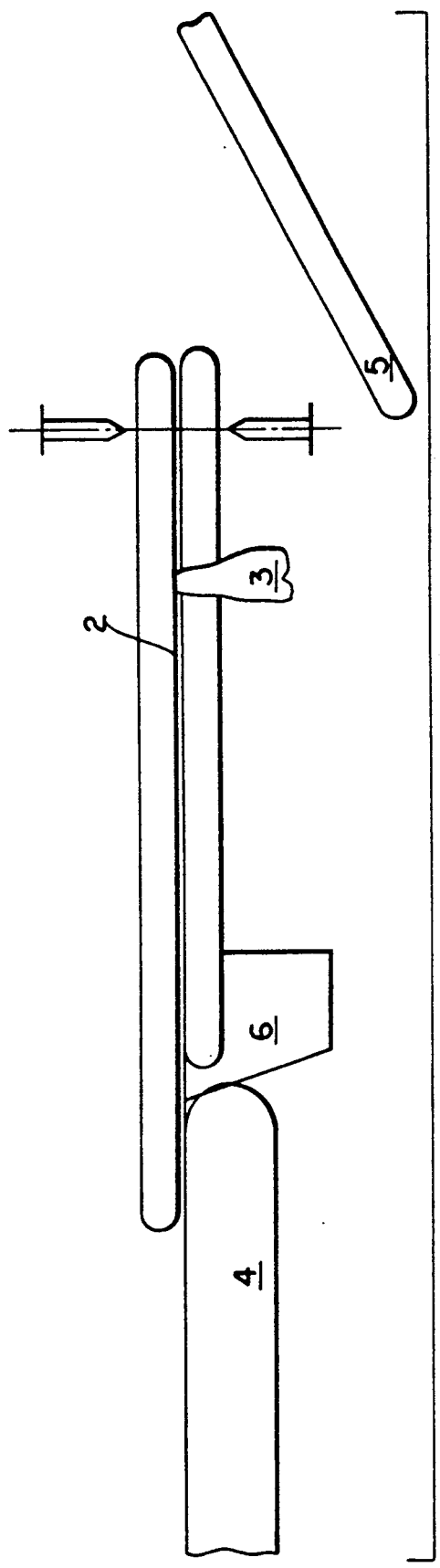

CONVEYOR SYSTEM FOR A FISH CLEANING PLANT

The invention concerns a conveyor system for handling food products, such as fish, and of the type comprising two cooperating, horizontally oriented, vertically displaced conveyor belts.

BACKGROUND OF THE INVENTION

The use of conveyor belts in connection with handling and processing of food products is widely known and may involve feed faces whose longitudinal directions may be oriented horizontally or in various inclinations transversely and longitudinally thereof.

For example, the Danish application 0447/76 concerns an apparatus for treating fish and comprises a plurality of conveyor belts having substantially horizontally oriented conveying surfaces. This system advances and positions fish along a horizontal path while the fish are subjected to i.a. cleaning. Thus, the supporting face does not change its nature during the processing of the fish.

Known is also a fish feeding system where the fish are gripped and retained by holding means which engage the gill openings of the fish and thereby retain and position the fish in a subsequent cleaning operation.

The above-mentioned plants have preferably been used in connection with cleaning fish of guts, etc., but conveyor belts are also known which support fish horizontally for feeding at a station where decided boning of fish takes place.

In the past, fish have thus been disposed on a horizontal supporting face for providing the said operations, but the invention is based on the finding that significant operational advantages will be obtained if the fish can be held in a vertical position via the tail, which makes complete cleaning of the fish possible, where not only guts, but also bones and other matter can advantageously be removed, especially because of an increasing automatization in this field too.

SUMMARY OF THE INVENTION

The object of the invention is to provide a conveyor system of the stated type which permits said retention and feeding of the fish so that the fish fillet is free of support substantially along its entire surface so that unimpeded treatment and advantageous offal collection are obtained.

This object is obtained by providing a conveyor system which has a double conveyor with two cooperating conveyor belts arranged vertically one above the other so as to be capable of gripping food products on a feed conveyor and being able to transport the food products to a receiving conveyor. When a conveyor system is constructed in this manner, the result will be a system which, because the conveyor belts of the double conveyor are oriented vertically above each other and horizontally, can catch, squeeze and retain the fish fillets in their tail portion in a very simple manner, so that they hang downwardly during transport and treatment in this station. Of course, this vertical treatment position entails that bones and other impurities can more easily be separated from the fish meat.

For this mode of treatment to be feasible with fish of various types, sizes and qualities, the double conveyor is arranged so that it can be laterally displaced at its collection end in a horizontal plane for positioning along the end face of a preceding conveyor. The angular position of the conveyor with respect to a preceding conveyor feed belt can currently be adjusted in this manner on the basis of information on the nature of the individual fillets, said information being recorded from a preceding station. When, the preceding detection station is arranged to give information to an ejector device provided in connection with the conveyor, control measurements from a station may signal rejection and thus ejection of a fish fillet when this does not comply with specified control data. The structure of the double conveyor makes it possible that ejection of fillets can advantageously be effected by locally reducing the squeezing so that the fillet just drops down into the collection unit for ejected fillets.

The conveyor system is moreover advantageously provided in combination with a chute or guide rail which is disposed in the immediate vicinity of the collection area of the two cooperating belts, and which extends obliquely downwardly in a soft curve with respect to the travelling direction of the conveyor. This chute entails that the transition of the fish fillets from horizontally supported position to vertical hanging in the tail is made as gentle as possible, so that the risk of breaks adjacent the squeezed tail portion is minimized to the greatest extent possible.

BRIEF DESCRIPTION OF THE DRAWINGS

The invention will be explained more fully below with reference to the drawing, in which FIG. 1 is a top view of the conveyor system of the invention, the double conveyor being disposed between substantially horizontally oriented feed and receive belts, FIG. 2 is a lateral view of the conveyor system illustrated in FIG. 1.

DETAILED DESCRIPTION OF THE PREFERRED EMBODIMENT

Figure 3:
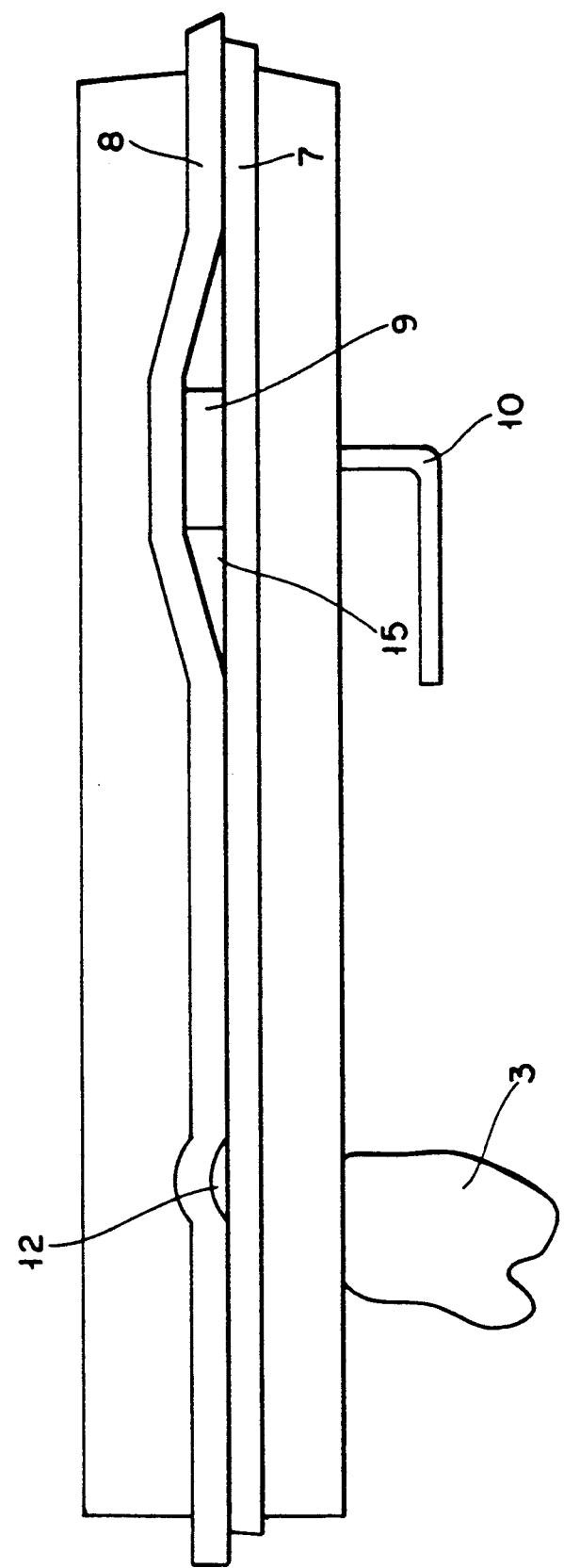
FIG. 3 shows the ejector device provided in connection with a conveyor horizontally opposite to it.

FIGS. 1 and 2 show the conveyor system 1 of the invention, the double conveyor 2 being present between a feed belt 4 and a receive belt 5. It also appears how the double conveyour 2 can be laterally displaced in a horizontal plane at its one end to a predetermined angular position, indicated at A and B in the working area.

The above-mentioned lateral displacement of the double conveyor is a feature provided on the basis of the recognition that not all fish have the same size, shape, meat distribution, mass as well as nature in other respects, so that a fish fillet 3 will tend to be broken at the tail portion immediately adjacent the squeezing area on the double conveyor. This system is so arranged that the lateral displacement is controlled on the basis of a preceding treatment station, which produces data on the state of the fish, including the above-mentioned parameters of its nature, e.g. by means of a special illumination and calculation technique, so that the horizontal angular position of the conveyor 2 is positioned in careful agreement with the feeding of each fish fillet.

It is moreover shown in FIGS. 1 and 2 how the said structure of the double conveyor 2 can be used in connection with a sort of chute or guide rail 6, which is disposed in the immediate vicinity of the fish fillet collection area of the conveyor 2, where the chute extends obliquely downwardly in a soft curve with respect to the travelling direction of the conveyor.

This chute serves the purpose of ensuring that the transition of the fish from horizontally supported position to vertical position hanging in the tail is made as gentle as possible, so that the risk of breaks at the squeezed tail portion is avoided to the greatest extent possible. The provision of this chute is therefore to be seen as an additional security measure, it being appreciated that the laterally displaceable double conveyor will be controlled to engage the tail portion of the fish fillet at a predetermined point, which means that for an optimum treatment area for the fish fillet there is a carefully adapted proportion between the point of attack of the double conveyor at the tail portion and the mass of the fish fillet.

It will likewise be appreciated that between the horizontal conveyors 4 and 5 the outlined conveyor system 1 is provided with water spray nozzles (not shown) which are known per se and adapted to remove bones and other impurities. This system entails that each fillet between the ends of the conveyor 2 passes the row of nozzles for performance of said fillet cleaning.

Figure 4:
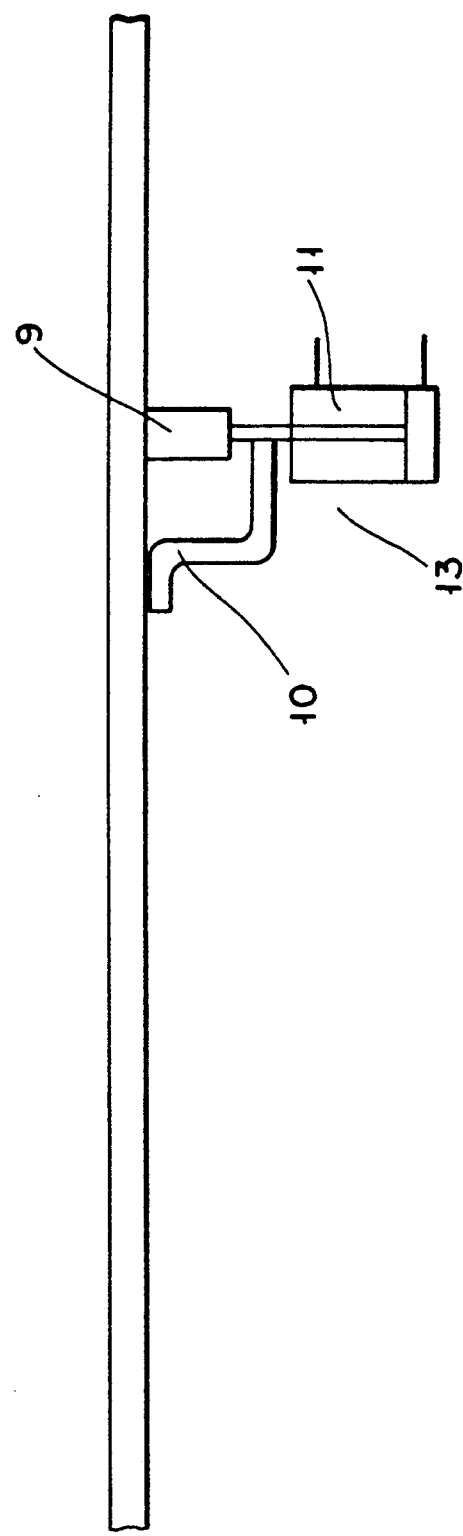
FIG. 4 is a top view of the ejector device illustrated in FIG. 3.

FIGS. 3 and 4 show a section of the double conveyor where an ejector device 13 according to the invention is provided. The cooperating feeding faces 7 and 8 of the double conveyor 2 are shown to be provided resiliently with a preset, adjustable pressure so that they are adapted to catch and squeeze a fish fillet 3, without its meat texture being destroyed. In FIG. 3, a fish fillet in a vertically hanging, squeezed position is being fed to a water spraying station disposed immediately adjacent the squeezing area 12 of the conveyor 2, where, under normal circumstances, a fish fillet will thus be boned and freed of various undesirable impurities.

If, on the other hand, the previously mentioned, preceding measuring and control station has rejected the fish fillet in question because of an unacceptable meat texture or for other reasons, and the fish fillet has not been processed completely, the ejector station 13 will instead have been signalled to reject the fish fillet. In case of rejection, a cylinder device 11 will be activated so that a wedge means 9 will be inserted between the belt faces 7 and 8 of the double conveyor 2, the belts forming a slot 15 so that the fillet is no longer squeezed. Simultaneously with the insertion of the wedge means between the two said belt faces a so-called ejector strap 10 connected with a cylinder device ejects the fillet from the conveyor, and then the cylinder device and the wedge means are withdrawn and the belt is closed. The station 13 will then be ready again to receive information on processing of the next fish fillet.

By means of this structure of a conveyor system adapted to cooperate with the other stations of a fish cleaning plant it is therefore possible to sort out deviating fish qualities automatically, simply and rationally via information from preceding stations.

I claim:

1. A conveyor system suitable for handling food products, such as fish, comprising:
   a feed conveyor means for transporting said food products, said feed conveyor means having a discharge end;
   a receiving conveyor means for transporting said food products, said receiving conveyor means having a receiving end;
   a double conveyor having a collecting end adjacent said discharge end and an output end adjacent said receiving end, said double conveyor having two cooperating conveyor belts arranged vertically one above the other so as to be capable of gripping food products on said feed conveyor means and being able to transport said food products to said receiving conveyor means; and
   conveyor displacement means to laterally displace the collecting end of said double conveyor in response to information signals, regarding the food products, obtained from a preceding processing station.

2. A conveyor system according to claim 1, further comprising an ejector device which is arranged adjacent to and along the area between the conveyor belts, the operation of said ejector device being controlled by information signals, regarding the food products, obtained from the preceding processing station.

3. A conveyor system according to claim 2, further comprising a chute which is arranged directly below the collecting end of the two cooperating conveyor belts, and which extends obliquely downwardly in a soft curve with respect to the travelling direction of the conveyor.

* * * * *